April 7, 1931.   F. G. GRAVES   1,799,554
SPREADER FOR CAPONIZING
Filed Oct. 14, 1929
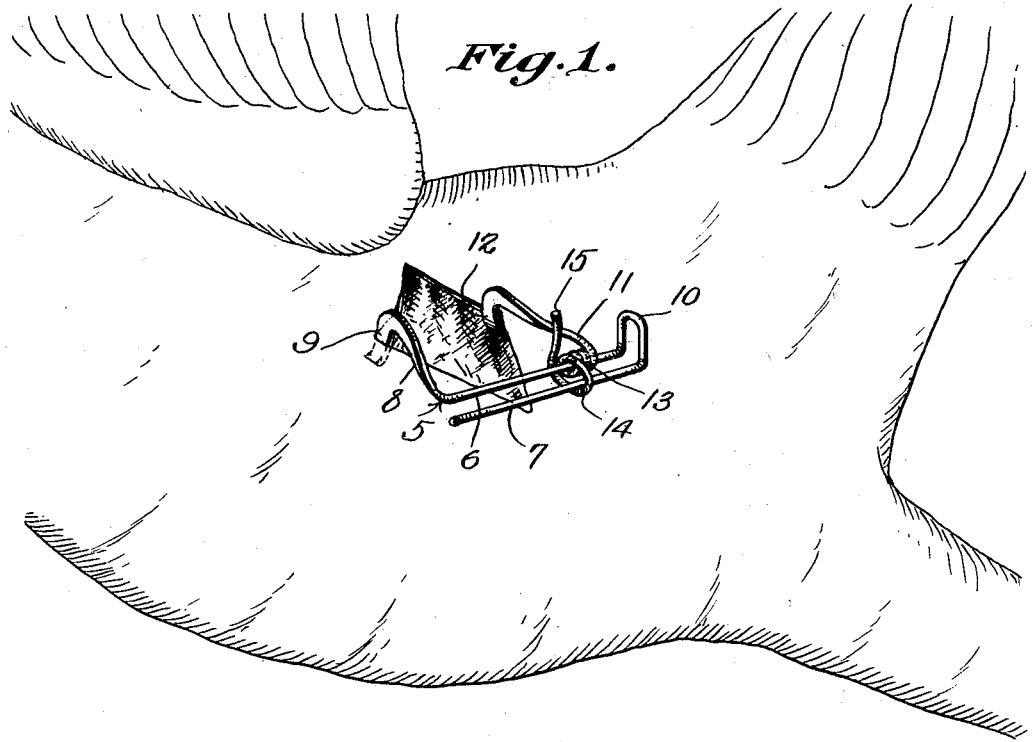
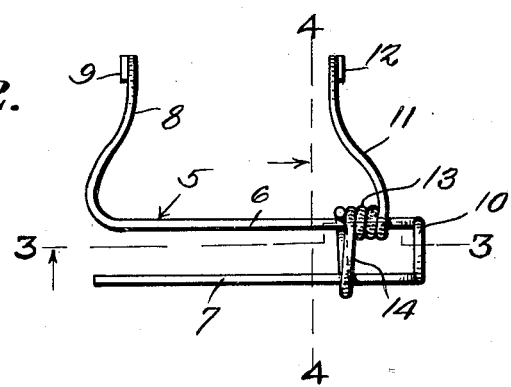
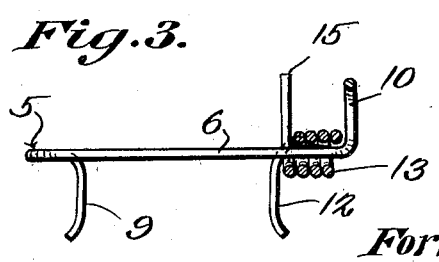
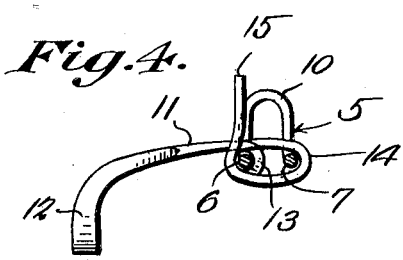
Forrest G. Graves, Inventor
By C. A. Snow & Co.
Attorneys.

Patented Apr. 7, 1931

1,799,554

UNITED STATES PATENT OFFICE

FORREST G. GRAVES, OF McCOOK, NEBRASKA

SPREADER FOR CAPONIZING

Application filed October 14, 1929. Serial No. 399,587.

This invention relates to a spreader especially designed for use in spreading the ribs of fowls during the caponizing operation, the primary object of the invention being to provide a spreader of this character which may be operated with facility, and one which may be manufactured at a comparatively low cost.

A further object of the invention is to provide a spreader of this character so constructed that the spreading fingers thereof will be securely held in their positions of adjustment to insure against the spreader slipping during the caponizing operation.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a perspective view of a spreader constructed in accordance with the invention, and illustrating the same in use.

Figure 2 is an elevational view of the spreader in its expanded position.

Figure 3 is a sectional view taken on line 3—3 of Figure 2.

Figure 4 is a sectional view taken on line 4—4 of Figure 2.

Referring to the drawing in detail, the spreader includes a main section 5 which is formed of a length of wire material bent upon itself to provide spaced parallel leg members 6 and 7 respectively, the leg member 6 being substantially long, the free end thereof extending at right angles providing an arm 8 formed with a laterally extended portion defining a finger 9 slightly curved to prevent the same from slipping from its position while in use.

A finger piece 10 forms a part of the body portion and extends at right angles with respect to the leg members 6 and 7, to be readily engaged by the forefinger of the operator. The reference character 11 designates an arm formed of a length of wire material having a laterally extended end portion 12 disposed in parallel relation with the finger 9, providing a spreading finger to cooperate with the finger 9 in spreading the ribs of the fowl under treatment.

As clearly shown by the drawing, the member 11 is formed with a coiled portion 13 and a loop portion 14, the free end of the loop portion extending upwardly providing a finger piece 15 to be engaged by the thumb. Thus it will be obvious that due to this construction, the arm 11 may be readily slid along the leg members 6 and 7 to bring the fingers 9 and 12 towards each other, or to space them apart. It might be further stated that the coil 13 is sufficiently large to permit the arm 11 to rock on the arm 6, to the end that a binding action is set up between the coil and the leg member 6, under pressure exerted on the arm 11 to hold the arm in its positions of adjustment.

In the use of the device, the fingers 9 and 12 are moved into close engagement with each other, whereupon they are inserted in the incision formed in the side of the fowl under treatment.

The fingers having been positioned between certain ribs of the fowl, are spread apart by sliding the arm 11 away from the arm 8 to the desired position, holding the ribs separated and the incision open to permit the testical removing instrument used in caponizing to be inserted. By sliding the arm 11 in the reverse direction, the spreader may be readily removed.

I claim:—

1. A spreader of the class described, comprising a body portion formed of a length of wire material bent upon itself to provide a pair of spaced parallel leg members, an arm formed at one end of one of the leg members, a movable arm having a coiled portion coiled around one of the leg members to slidably mount the last mentioned arm on the body portion, a loop forming a part of the last mentioned arm and looped around both leg members to restrict movement of the movable arm, and a finger piece formed on the movable arm.

2. A spreader of the class described, comprising a body portion embodying spaced parallel leg members, an arm formed at one end of the body portion, a movable arm having a coiled portion coiled around one of the leg members, and a loop member looped around the other leg member to loosely mount the movable arm on the body portion, said movable arm adapted to rock on the parallel leg members to set up a binding action to hold the movable arm against movement, and finger pieces formed at the ends of the arms.

In testimony that I claim the foregoing as my own, I have hereto affixed my signature.

FORREST G. GRAVES.